United States Patent
Sato et al.

(10) Patent No.: US 8,992,666 B2
(45) Date of Patent: Mar. 31, 2015

(54) METHOD OF LEACHING COPPER ORE

(71) Applicant: JX Nippon Mining & Metals Corporation, Tokyo (JP)

(72) Inventors: Katsuyuki Sato, Hitachi (JP); Manabu Manabe, Tokyo (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 0 days.

(21) Appl. No.: 13/765,729

(22) Filed: Feb. 13, 2013

(65) Prior Publication Data

US 2013/0239752 A1    Sep. 19, 2013

(30) Foreign Application Priority Data

Mar. 14, 2012  (JP) ................. 2012-057326

(51) Int. Cl.
  *C22B 15/00*  (2006.01)
  *C22B 3/04*  (2006.01)
(52) U.S. Cl.
  CPC ............... *C22B 15/0067* (2013.01); *C22B 3/04* (2013.01); *C22B 15/0069* (2013.01)
  USPC ............................................................. 75/743

(58) Field of Classification Search
  CPC .............................. C22B 3/04; C22B 15/0065
  USPC ............................................................. 75/743
  See application file for complete search history.

(56) References Cited

U.S. PATENT DOCUMENTS

| | | | |
|---|---|---|---|
| 4,260,588 A * | 4/1981 | Piret et al. ............. | 423/37 |
| 8,163,063 B2 * | 4/2012 | Manabe .................. | 75/743 |
| 2010/0018349 A1 * | 1/2010 | Manabe .................. | 75/743 |
| 2011/0041654 A1 | 2/2011 | Manabe | |

FOREIGN PATENT DOCUMENTS

| | | |
|---|---|---|
| JP | 2010-24511 A | 2/2010 |
| JP | 2011-42858 A | 3/2011 |

* cited by examiner

*Primary Examiner* — George Wyszomierski
*Assistant Examiner* — Tima M McGuthry Banks
(74) *Attorney, Agent, or Firm* — Birch, Stewart, Kolasch & Birch, LLP

(57) ABSTRACT

Provided is a method of leaching copper ore which contains chalcopyrite, the method includes a first leaching stage based on an oxidative leaching reaction of copper by iron (III) ion, and a second leaching stage, in succession to the first leaching stage, using a solution containing iodide ion and iron (III) ion.

4 Claims, 3 Drawing Sheets

METHOD OF LEACHING COPPER ORE

CROSS-REFERENCE TO RELATED APPLICATION

This application is based upon and claims the benefit of priority of the prior Japanese Patent Application No. 2012-057326, filed on Mar. 14, 2012, the entire contents of which are incorporated herein by reference.

BACKGROUND

1. Technical Field

The present invention relates to a method of efficiently leaching copper from copper ore which contains chalcopyrite.

2. Related Art

One known method of recovering copper from copper ore is referred to as L-SX-EW process. According to the L-SX-EW process, copper ore is leached with sulfuric acid or the like (L=Leaching), selectively recovering copper ion from the copper-containing leachate by solvent extraction (SX=Solvent Extraction), followed by concentration, and electrolytic cathode copper is produced from the copper sulfate solution by electro-winning (EW).

In this process, among copper components contained in the copper ore, copper oxide may readily yield copper by a simple acid leaching. On the other hand, among copper components contained in the copper ore, secondary copper sulfide such as chalcocite ($Cu_2S$) may be leached by iron (III) ion, so that copper may efficiently be leached by ferric leaching using an iron (III) ion-containing solution, or bacterial leaching making use of microorganism which can oxidize iron (II) ion in the solution into iron (III) ion.

The ferric leaching of the secondary copper sulfide ore is supposed to proceed according to the chemical reaction formula below (formula 1). Also the bacteria leaching is based on the same reaction mechanism with the ferric leaching, characterized in continuously supplying an oxidant by consecutively oxidizing iron (II) ion, produced according to (formula 1), into iron (III) ion with the aid of iron-oxidizing microorganism.

$$Cu_2S+4Fe^{3+} \rightarrow 2Cu^{2+}+4Fe^{2+}+S \quad \text{(formula 1)}$$

Among copper components contained in the copper ore, primary copper sulfide such as chalcopyrite ($CuFeS_2$) may, however, be leached remarkably slowly by the simple acid leaching, the ferric leaching and the bacterial leaching. These methods have therefore been thought to be not suitable, since it takes an extremely long time to attain a high yield of copper leaching. If it would be granted that recovery of copper from the primary copper sulfide ore is not conducted, the yield of copper leaching will stay at a low level, and the economy is diminished anyway.

On the other hand, chalcopyrite is abundant in the copper ore, so that it has been desired to recover copper also from chalcopyrite in a highly efficient manner. There have therefore been proposed various techniques for improving the leaching rate in the process of leaching from the chalcopyrite-containing copper ore. Among them, the method of leaching by adding iodine (or iodide ion) and iron (III) ion is known to improve the leaching rate from the chalcopyrite-containing copper ore, by feeding iodine as a catalyst in the form of dilute aqueous solution (Japanese Laid-Open Patent Publication Nos. 2010-024511 and 2011-042858).

SUMMARY

The method of leaching by adding iodine (or iodide ion) and iron (III) ion is known to improve the rate of leaching from chalcopyrite-containing copper ore at a low iodine concentration. The method has, however, a room for further improvement from the viewpoint that the method is susceptible to iodine loss during leaching, since iodine is highly volatile, readily adsorbed by hydrophobic substance, and iodide ion can react with $Cu^{2+}$ to produce precipitate, and also from the viewpoint that the operation would cost high since iodine is expensive.

Conceived to address the problems described in the above, the present invention is to provide a method of leaching from chalcopyrite by adding iodine, capable of reducing iodine loss without lowering the final yield of leaching.

The present inventors found out from their thorough investigations directed to solve the problems that, in the process of leaching copper from the chalcopyrite-containing copper ore, primary copper sulfide ore which is known to be very poorly soluble among various copper ores may be solubilized by iodine, and came to an idea that copper oxide ore and secondary copper sulfide ore, which are soluble without iodine, are first subjected to leaching by the ferric leaching or bacterial leaching based on the general oxidative leaching reaction (first leaching stage), and primary copper sulfide ore which is less soluble in the first leaching stage is then subjected to leaching in a solution containing iodide ion and iron (III) ion (second leaching stage). In other words, it was found that, by using iodine only for leaching from the primary copper sulfide ore, the iodine loss could be minimized, while keeping the final yield of copper leaching comparable to that in the conventional method. The present invention was completed based on these findings.

The present invention encompasses the following aspects below.

(1) A method of leaching copper ore which contains chalcopyrite, the method includes a first leaching stage based on an oxidative leaching reaction of copper by iron (III) ion, and a second leaching stage, in succession to the first leaching stage, using a solution containing iodide ion and iron (III) ion.

(2) The method according to (1), wherein the first leaching stage is proceeded until yield of leaching of secondary copper sulfide ore in the copper ore reaches 80% or above.

(3) The method according to (1), wherein in the first leaching stage 1 to 3 $m^3$ of leaching solution per one ton of ore is provided to thereby leach the copper sulfide ore.

(4) The method according to (3), wherein in the first leaching stage the leaching solution has an iron (III) ion concentration of 2 to 5 g/L.

DETAILED DESCRIPTION

Figure 1:
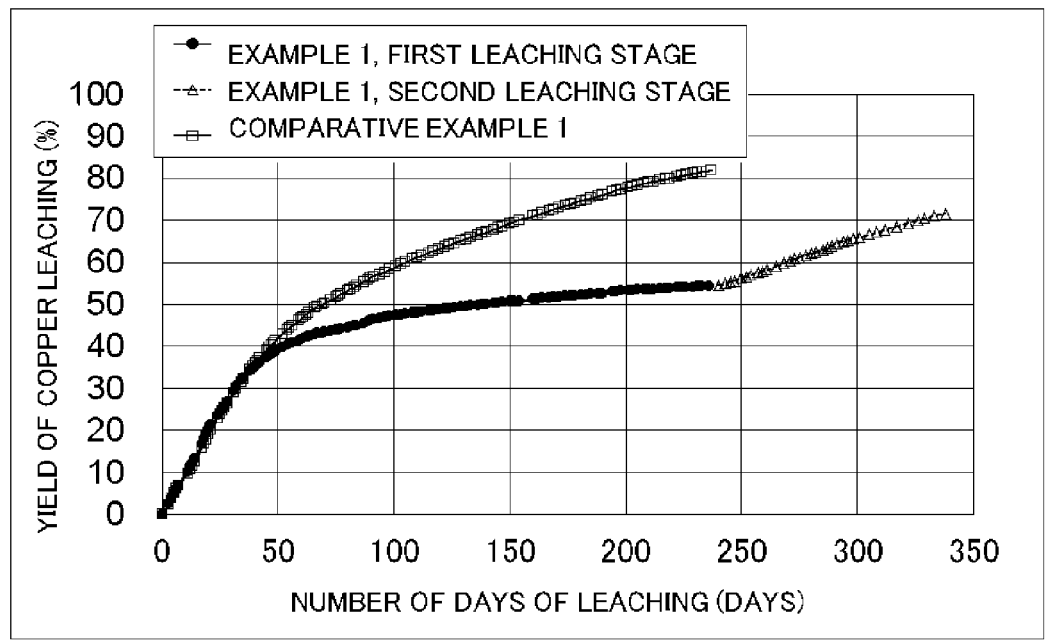
FIG. 1 is a graph illustrating changes in yield of copper leaching (%) in relation to the number of days of leaching (days) respectively in Example 1 and Comparative Example 1.

The present invention will be detailed below.

The present invention is targeted at recovery of copper from chalcopyrite-containing copper ore, which effectively suppresses iodine consumption by reducing the iodine loss in the process of leaching.

Solubilization and leaching of chalcopyrite by the method of the present invention are supposed to proceed according to a series of iodine-assisted catalytic reactions expressed by (formula 2) and (formula 3).

$$2I^- + 2Fe^{3+} \rightarrow I_2 + 2Fe^{2+} \quad \text{(formula 2)}$$

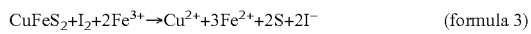

$$CuFeS_2 + I_2 + 2Fe^{3+} \rightarrow Cu^{2+} + 3Fe^{2+} + 2S + 2I^- \quad \text{(formula 3)}$$

$I_2$ produced in (formula 2) is converted to $I^-$ in (formula 3), and the reaction of (formula 2) proceeds again. If the reaction proceeds alone by itself, no iodine loss occurs. $I_2$ produced in (formula 2) is, however, volatile or may readily be adsorbed by hydrophobic substances such as resin. In addition, when $Cu^{2+}$ exists in the solution, it may react with iodide ion to produce elementary iodine and very poorly soluble CuI, as expressed by (formula 4).

$$2Cu^{2+} + 4I^- \rightarrow I_2 + 2CuI \quad \text{(formula 4)}$$

From these points of view, it is supposed that iodine ($I_2$) may no more contribute to leaching of copper ore, and thereby the method of leaching in a solution containing iodide ion and iron (III) ion inevitably causes the iodine loss as a consequence. For the purpose of reducing the iodine loss, it is therefore considered important to shorten the period over which the leaching proceeds under the addition of iodine, and to keep iodine ion away from the solution containing an excessive amount of $Cu^{2+}$.

The process of leaching of chalcopyrite-containing copper ore is then proceeded by the first leaching stage based on an oxidative leaching reaction of copper with the aid of iron (III) ion free from iodine, such as by the ferric leaching or the bacterial leaching, and by the second leaching stage, in succession to the first leaching stage, using a solution containing iodide ion and iron (III) ion.

In the first leaching stage, the copper oxide ore and the secondary copper sulfide ore contained in a mixed manner in the leaching solution are leached based on the oxidative leaching reaction such as the iodine-free ferric leaching or the bacterial leaching. In the first leaching stage, no iodine loss occurs since iodine is not used.

In the first leaching stage, leaching process of the secondary copper sulfide ore in the copper ore is preferably proceeded until the yield of leaching of secondary copper sulfide ore in the copper ore reaches 80% or above, from the viewpoint of lowering copper concentration of the leaching solution down to a degree not causative of precipitation of copper together with iodide ion.

It is further preferable in the first leaching stage to provide 1 to 3 m³ of leaching solution per one ton of ore to thereby leach the copper sulfide ore from the viewpoint of setting a proper period of the first leaching stage.

In the first leaching stage, from the viewpoint of lowering the leaching rate not so excessively, it is preferable to adjust the iron (III) ion concentration in the leaching solution to 2 g/L or more. From the viewpoint of recycling, a practical range is preferably 5 g/L or less.

In the second leaching stage, the leaching is proceeded using a solution containing iodide ion and iron (III) ion.

In the second leaching stage, the primary copper sulfide ore such as chalcopyrite may be leached efficiently at normal temperature. Since the copper oxide ore and the secondary copper sulfide ore have already been leached in the first leaching stage, iodine is now used in the leaching solution with a low copper concentration, so that the loss of iodine ($I_2$) due to formation of CuI precipitate as expressed by (formula 4) is supposed to be suppressed.

Moreover, in the invention, loss of iodine ($I_2$) due to volatilization can occur only in the second leaching stage, so that it is obvious that the loss is smaller than in the conventional leaching where iodine was added from the beginning of the leaching reaction.

In a preferable embodiment, possible forms of iodide ion to be added include salts such as sodium iodide and potassium iodide, or a solution obtained by dissolving hydroiodic acid into sulfuric acid solution. Concentration of iodide ion to be added is 50 to 300 mg/L, and is preferably 50 to 100 mg/L, from the viewpoint of reducing the cost and environmental burden.

As described above, according to the method of the present invention, the chalcopyrite-containing copper ore may be leached efficiently at normal temperature, by leaching the copper oxide ore and the secondary copper sulfide ore in the first leaching stage based on the oxidative leaching reaction without using iodine, and then by leaching the primary copper sulfide ore which is very poorly soluble in the second leaching stage based on the oxidative leaching reaction using iodine. Since it is now possible to use iodine only in the leaching of primary copper sulfide ore which is very poorly soluble, so that the iodine loss may be reduced as a consequence.

EXAMPLES

The present invention will further be detailed referring to Examples, without limiting the present invention.

1. First Copper Ore

Crude ore produced in Chile was investigated. Total copper content was 0.54%. Copper ore composition, estimated by sequential assay, was found to be 5% copper oxide ore, 41% secondary copper sulfide ore, and 54% primary copper sulfide ore.

The sequential assay herein is a method of eluting copper ores in the ore according to procedures below, and calculating the contents of copper oxide ore, secondary copper sulfide ore and primary copper sulfide ore based on assay data of the eluates. The analysis was outsourced to a testing and consulting facility, SGS Lakefield Research Limited Chile S.A.

(1) Copper oxide ore: a sample crushed to a certain grain size is added with sulfuric acid, and the mixture is stirred for a certain period. Dissolved copper is quantified.

(2) Secondary copper sulfide ore: a solid fraction obtained by solid-liquid separation in the assay of the copper oxide ore is added with sodium cyanide solution, and the mixture is stirred for a certain period. Dissolved copper is quantified.

(3) Primary copper sulfide ore: a solid fraction obtained by solid-liquid separation of the secondary copper sulfide ore is added with nitric acid and perchloric acid, the mixture is dried up on a hot plate, the residue is treated with hydrochloric acid and distilled water for dissolution. Dissolved copper is quantified.

The crude ore having the composition described in the above was crushed to a grain size of 20 mm or smaller, and 63 kg of which was packed in a transparent vinyl chloride cylinder of 20 cm in diameter and 1.5 m in height. The bottom portion of the vinyl chloride cylinder was attached with a filter cloth and a perforated plate made of vinyl chloride, so that the leaching solution may be recovered as an eluate after passing therethrough. The leaching solution described in the next was supplied using a pump, from the top of the vinyl chloride cylinder.

Example 1

Conditions include an iron (III) ion concentration of 2 g/L, pH 1.8, and a feeding rate of 4 L/day (first leaching stage). Iron (III) ion was prepared by bacterial oxidation of iron (II) sulfate using an iron oxidizing bacteria, *Acidithiobacillus Ferrooxidans*. Leaching was then conducted using a solution containing iodide ion and iron (III) ion (second leaching stage). KI was used as an iodide ion source, and conditions include a concentration of 260 mg/L (iodine concentration of 200 mg/L), pH 1.8, and a feeding rate of 2 L/day. Iron (III) ion concentration was adjusted to 4 g/L, pH 1.8, and was fed at a rate of 2 L/day. Accordingly, the final concentration was 100 mg/L for iodine and 2 g/L for iron (III) ion, pH 1.8, and a feeding rate was 4 L/day.

Comparative Example 1

For comparison, the leaching was conducted similarly to Example 1, except that the first leaching stage was omitted, and that the solution containing iodide ion and iron (III) ion was used from the beginning of leaching. KI was used as an iodide ion source, wherein conditions include a concentration of 260 mg/L (iodine concentration of 200 mg/L), pH 1.8, and a feeding rate of 2 L/day. Iron (III) ion concentration was adjusted to 4 g/L, pH 1.8, and was fed at a rate of 2 L/day. Accordingly, the final concentration was 100 mg/L for iodine and 2 g/L for iron (III) ion, pH 1.8, and a feeding rate was 4 L/day, which were same as those in the second leaching stage of Example 1.

The copper concentration and the iron concentration in Example 1 and Comparative Example 1 were measured using an ICP emission spectrophotometric analyzer (ICP-AES), and the iodine concentration was determined by ion selective electrode after enough reducing iodine into iodide ion. The iodine loss was estimated based on the amount of iodine in the leaching solution and the amount of iodine in the leachate.

Figure 2:
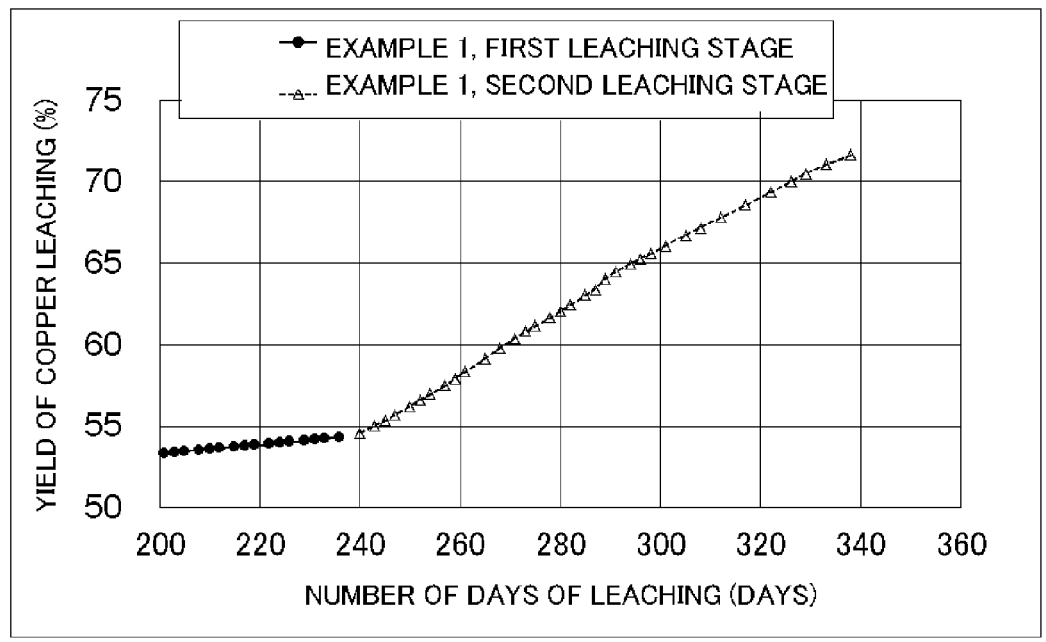
FIG. 2 is a graph illustrating changes in the yield of copper leaching at around switching from the first leaching stage to the second leaching stage in Example 1.
Figure 3:
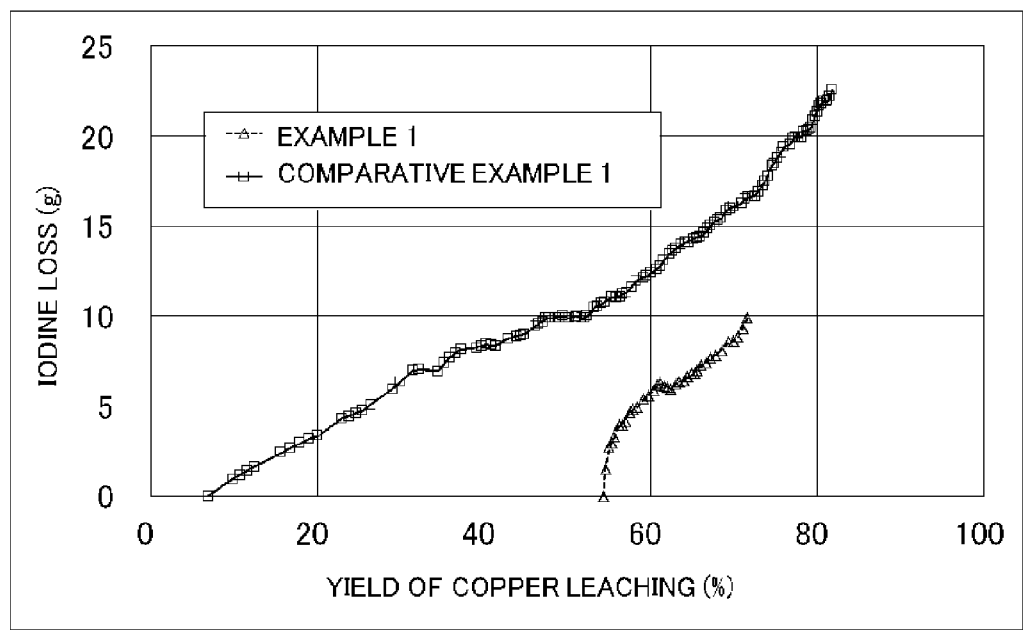
FIG. 3 is a graph illustrating changes in the yield of copper leaching (%) and iodine loss (g) respectively in Example 1 and Comparative Example 1.
Figure 4:
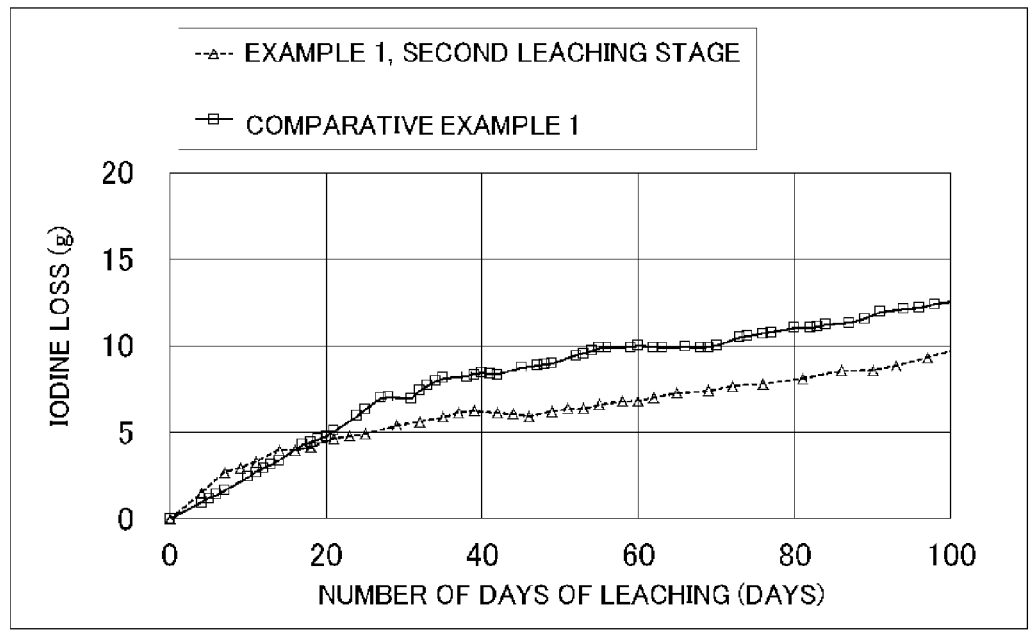
FIG. 4 is a graph illustrating changes in the iodine loss (g) in relation to the number of days of leaching (days) respectively in the second leaching stage of Example 1 and Comparative Example 1.
Figure 5:
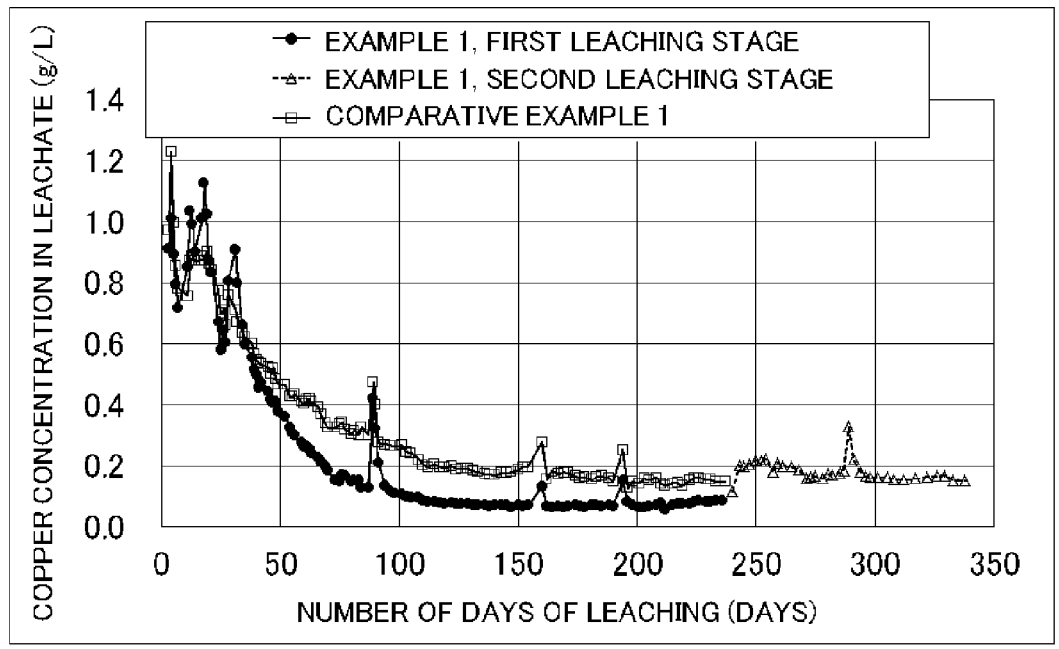
FIG. 5 is a graph illustrating changes in copper concentration in leachate (g/L) in relation to the number of days of leaching (days) respectively in Example 1 and Comparative Example 1.

FIG. 1 is a graph illustrating changes in yield of copper leaching (%) in relation to the number of days of leaching (days) respectively in Example 1 and Comparative Example 1; and FIG. 2 is an enlarged graph illustrating changes in the yield of copper leaching on the 200-th day and thereafter, after the start of leaching, so as to clearly show the changes at around switching (240-th day) from the first leaching stage to the second leaching stage in Example 1. FIG. 3 is a graph illustrating changes in the yield of copper leaching (%) and iodine loss (g) respectively in Example 1 and Comparative Example 1; and FIG. 4 is a graph illustrating changes in the iodine loss (g) in relation to the number of days of leaching (days) in the second leaching stage of Example 1 and the number of days of leaching (days) in Comparative Example 1, respectively; and FIG. 5 is a graph illustrating changes in copper concentration in leachate (g/L) in relation to the number of days of leaching (days) respectively in Example 1 and Comparative Example 1.

As illustrated in FIG. 1, the yield of copper leaching up to 40% or around of the total yield of copper leaching, which accounts for approximately 80% of the total content (46%) of the copper oxide ore (5%) and the secondary copper sulfide ore (41%) in the copper ore, was equivalent in both of Example 1 and Comparative Example 1.

This indicates that the copper oxide ore and the secondary copper sulfide ore may be leached efficiently by the ordinary bacterial leaching as shown in Example 1, without using an iron (III) ion leaching solution added with iodine (solution containing iodide ion and iron (III) ion), and also indicates that there is no apparent difference between the both even if the copper oxide ore and the secondary copper sulfide ore, accompanied by chalcopyrite, are leached using the iron (III) ion leaching solution added with iodine, from the beginning as shown by Comparative Example 1. As a consequence, it is shown that a catalytic effect ascribable to addition of iodine is not expressed to a large extent in the leaching of the copper oxide ore and the secondary copper sulfide ore.

Thereafter, as the leaching proceeds, the ore to be processed becomes more rich in the primary copper sulfide ore, so that the leaching rate becomes sluggish in the first leaching stage based on the bacterial leaching without adding iodine, as shown by Example 1.

At the 240-th day and thereafter in Example 1, the second leaching stage proceeded using the solution containing iodide ion and iron (III) ion, under the same leaching conditions with Comparative Example 1. As illustrated in FIG. 1 and FIG. 2, while increase in the yield of copper leaching was found to be sluggish in the bacterial leaching (first leaching stage) in Example 1, a high level of copper leaching rate was recovered after the process was switched to the leaching using a solution containing iodide ion and iron (III) ion (second leaching stage).

This indicates that it is not essential to add iodine from the early period of leaching, and that the two-stage leaching of the present invention, which includes the bacterial leaching without iodine (first leaching stage) followed by the second leaching stage using the solution containing iodide ion and iron (III) ion, is effective enough to promote copper leaching to a degree comparable to the leaching using the solution containing iodide ion and iron (III) ion from the beginning, despite the amount of use of iodine is small as a whole.

Since Example 1 uses no iodine ($I_2$) in the leaching reaction in the first leaching stage, and the above-described iodine loss is therefore considered to be none, so that, as illustrated in FIG. 3, Example 1 is smaller in the iodine loss under the same yield of copper leaching as compared with Comparative Example 1 in which iodine was added from the beginning of leaching.

Also as illustrated in FIG. 4, the iodine ($I_2$) loss is found to be smaller in the second leaching stage of Example 1 than in Comparative Example 1 under the same number of days of leaching. This is supposedly because, as illustrated in FIG. 5, addition of iodine from the beginning of leaching as in Comparative Example 1 more readily causes the CuI precipitation reaction expressed by (formula 4) to thereby increase the iodine loss, whereas under the conditions of leaching in the second leaching stage of Example 1, iodine ($I_2$) is used in the solution already reduced in the copper concentration, so that the iodine loss due to precipitation of CuI expressed by (formula 4) may be reduced.

In Comparative Example 1 in which iodine was added from the beginning of leaching, it may otherwise be thought that the copper leaching rate would increase by virtue of iodine as compared with that in the first leaching stage of Example 1, but the apparent copper leaching rate in the initial state up to when an yield of copper leaching of 40% is attained is found to be comparable, supposedly because the solution in the early period of leaching reaction has a high copper concentration, and so that the CuI precipitation reaction expressed by (formula 4) proceeds to consume not only iodine but also copper.

2. The Second Copper Ore

Crude ore produced in Chile was investigated. Total copper content was 1.24%. Copper ore composition, estimated by sequential assay, was found to be 7% copper oxide ore, 37% secondary copper sulfide ore, and 56% primary copper sulfide ore.

The sequential assay was outsourced to a testing and consulting facility, SGS Lakefield Research Limited Chile S.A.

The crude ore having the composition described in the above was crushed to a grain size of 20 mm or smaller, and 12 kg of which was packed in a transparent vinyl chloride cylinder of 10 cm in diameter and 1 m in height. The bottom portion of the vinyl chloride cylinder was attached with a filter cloth and a perforated plate made of vinyl chloride, so that the leaching solution may be recovered as an eluate after passing therethrough. The leaching solution described in the next was supplied using a pump, from the top of the vinyl chloride cylinder.

Example 2

Conditions include an iron (III) ion concentration of 2 g/L, pH 1.8, and a feeding rate of 2 L/day (first leaching stage). Iron (III) ion was prepared by bacterial oxidation of iron (II) sulfate using an iron oxidizing bacteria, *Acidithiobacillus Ferrooxidans*. The first leaching stage was conducted for 14 days (using 2 m$^3$ leaching solution per one ton of ore, or 2 m$^3$/t). Next, in the second leaching stage, iodine was added using KI as an iodide ion source, wherein conditions include a concentration of 260 mg/L (iodine concentration of 200 mg/L), pH 1.8, and a feeding rate of 1 L/day. Iron (III) ion concentration was adjusted to 4 g/L, pH 1.8, and was fed at a rate of 1 L/day. Accordingly, the final concentration was 100 mg/L for iodine and 2 g/L for iron (III) ion, pH 1.8, and a feeding rate was 2 L/day.

Comparative Example 2

The ore was leached by the bacterial leaching under the same conditions with the first leaching stage of Example 1, with an iron (III) ion concentration of 2 g/L, pH 1.8, and a feeding rate of 2 L/day.

The copper concentration and the iron concentration in Example 2 and Comparative Example 2 were determined by an ICP emission spectrophotometric analyzer (ICP-AES), and the iodine concentration was determined by the ion selective electrode after enough reducing iodine into iodide ion. The iodine loss was estimated by comparing with the amount of iodine in the leaching solution and the amount of iodine in the leachate.

Figure 6:
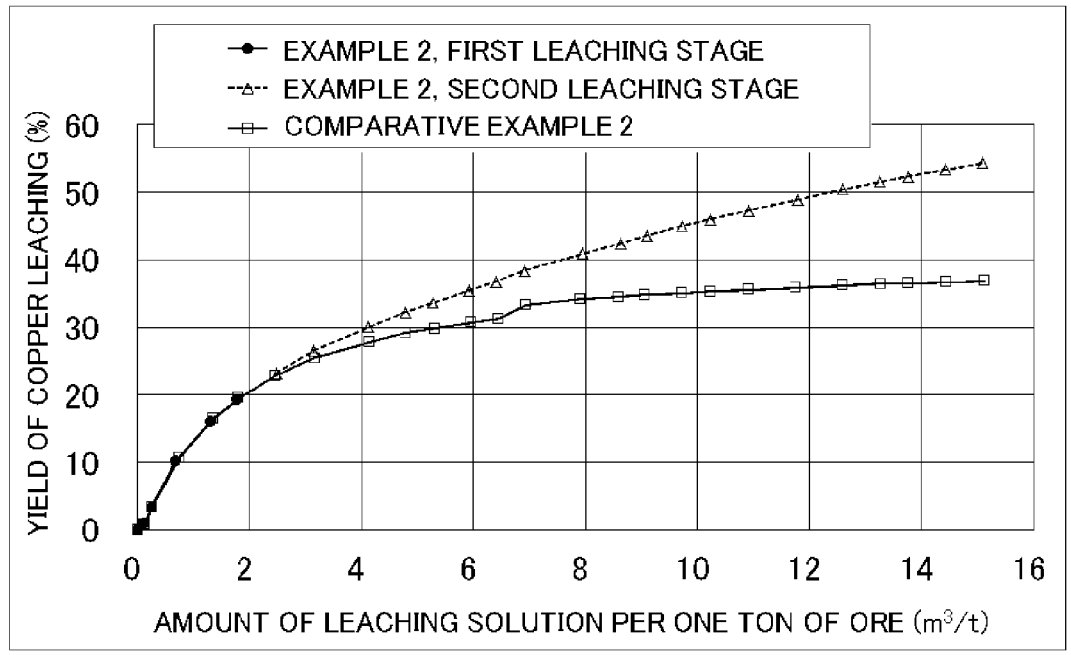
FIG. 6 is a graph illustrating changes in the yield of copper leaching (%) in relation to the amount of leaching solution (m³/t) per one ton of ore respectively in Example 2 and Comparative Example 2.

FIG. 6 is a graph illustrating changes in the yield of copper leaching (%) in relation to the amount of feeding of leaching solution (m$^3$/t) per one ton of ore respectively in Example 2 and Comparative Example 2.

As illustrated in FIG. 6, Example 2 and Comparative Example 2 showed same copper leaching behaviour over a period from the beginning of leaching up to when the amount of feeding of leaching solution per one ton of ore reached 2 m$^3$/t, since the same leaching solution was used. The period was 14 days.

In Example 2, when the amount of feeding of leaching solution per one ton of ore reached 2 m$^3$/t, the leaching was switched to the leaching under addition of iodine, which was the same condition with the second leaching stage of Example 1. On the other hand, in Comparative Example 2, the ordinary bacterial leaching was continued also after the amount of feeding of leaching solution reached 2 m$^3$/t (the 14-th day and thereafter).

It was found from Example 2 and Comparative Example 2 that, while Example 2 kept a high level of reaching rate by switching the leaching process to the leaching under addition of iodine after the amount of feeding of leaching solution reached 2 m$^3$/t, Comparative Example 2 was slowed down in the copper leaching rate as compared with Example 2, as a result of continuation of the bacterial leaching.

It is understood from Example 2 and Comparative Example 2 that, by conducting leaching first by the bacterial leaching (first leaching stage), and then by the second leaching stage using the solution containing iodide ion and iron (III) ion, the copper leaching rate increases significantly, that is, an excellent effect of promoting copper leaching may be expressed, as compared with the case where the bacterial leaching was continued. Similarly as described previously, the iodine loss is again considered to be none in the first leaching stage, since no iodine ($I_2$) is used.

According to the method of the present invention, copper may be leached efficiently under the normal temperature, not only from the readily soluble copper oxide ore and the secondary copper sulfide ore, but also from the poorly soluble primary copper sulfide ore such as chalcopyrite. Additionally the iodine loss is decreased.

While the present invention is particularly effective for the process where the leaching solution is provided over a stack such as heap or dump, it is also effective when applied to a method of leaching a concentrate by batch leaching in a tank.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. A method of leaching copper ore which contains chalcopyrite, the method comprising a first leaching stage based on an oxidative leaching reaction of copper by iron (III) ion to reduce secondary copper sulfide ore in the copper ore, and a second leaching stage, in succession to the first leaching stage, using a solution containing iodide ion and iron (III) ion.

2. The method according to claim 1, wherein the first leaching stage is proceeded until yield of leaching of secondary copper sulfide ore in the copper ore reaches 80% by mass of said secondary copper sulfide ore or above.

3. The method according to claim 1, wherein in the first leaching stage 1 to 3 m$^3$ of leaching solution per one ton of ore is provided to thereby leach the copper ore.

4. The method according to claim 3, wherein in the first leaching stage the leaching solution has an iron (III) ion concentration of 2 to 5 g/L.

* * * * *